United States Patent [19]
Heberle

[11] Patent Number: 5,482,134
[45] Date of Patent: Jan. 9, 1996

[54] ANTICOLLISION DEVICE FOR DRIVERLESS INDUSTRIAL TRUCKS

[75] Inventor: Kurt Heberle, Bodelshausen, Germany

[73] Assignee: Indumat GmbH & Co. KG, Reutlingen, Germany

[21] Appl. No.: 66,495

[22] Filed: May 24, 1993

[30] Foreign Application Priority Data

May 25, 1992 [DE] Germany ............. 42 17 264.0

[51] Int. Cl.⁶ ................................................. B60K 28/10
[52] U.S. Cl. ................. 180/275; 180/277; 293/4; 293/27
[58] Field of Search ................................. 180/275, 274, 180/277, 271; 293/4, 27; 414/275

[56] References Cited

U.S. PATENT DOCUMENTS

| | | | |
|---|---|---|---|
| 1,252,551 | 1/1918 | Cole | 180/277 |
| 4,403,674 | 9/1983 | Viall, Sr. et al. | 180/275 |
| 4,635,982 | 1/1987 | Feldmann et al. | 293/4 |
| 4,674,590 | 6/1987 | Krieg | 180/275 |
| 4,951,985 | 8/1990 | Pong et al. | 293/4 |

*Primary Examiner*—Eric D. Culbreth
*Attorney, Agent, or Firm*—McGlew and Tuttle

[57] ABSTRACT

In a anticollision device for driverless industrial trucks (1), preferably automotive assembly platforms, switching bails (9) are articulated by a bilateral lever mechanisms at one end of the industrial truck. These switching bails are located in an outer operating position (37) during single travel and they trigger an emergency stop via switches (11, 30) on impact against an obstacle. On entry into a pushing unit section, control rollers (13) run, in a mechanically restrictedly guided manner, up onto stationary guide rails (14), and automatically engage the lever mechanisms (42) via roller levers (12), and two guide sleeves (24), arranged on a cross guide (25), are displaced linearly in relation to one another against the pretensioning force of at least one spring (26) via spring levers (23). As a result, the switching bails (9) are brought into an out-of-operation position (38) located within the contour of the vehicle, while the switches (11, 30) are inactivated at the same time, as a result of which pushing forces generated by an external drive (35) can be transmitted to the vehicle chassis (28) of the vehicle traveling in front of it from the industrial truck (1) actually traveling in the rearmost position relatively without loss. After elimination of the mechanical restricted guidance, the lever mechanisms (42) are again pressed automatically into their original positions by the pretensioning force of the spring (26), and the switching bails (9) are now displaced from the vehicle contour into their operating position (37).

13 Claims, 4 Drawing Sheets

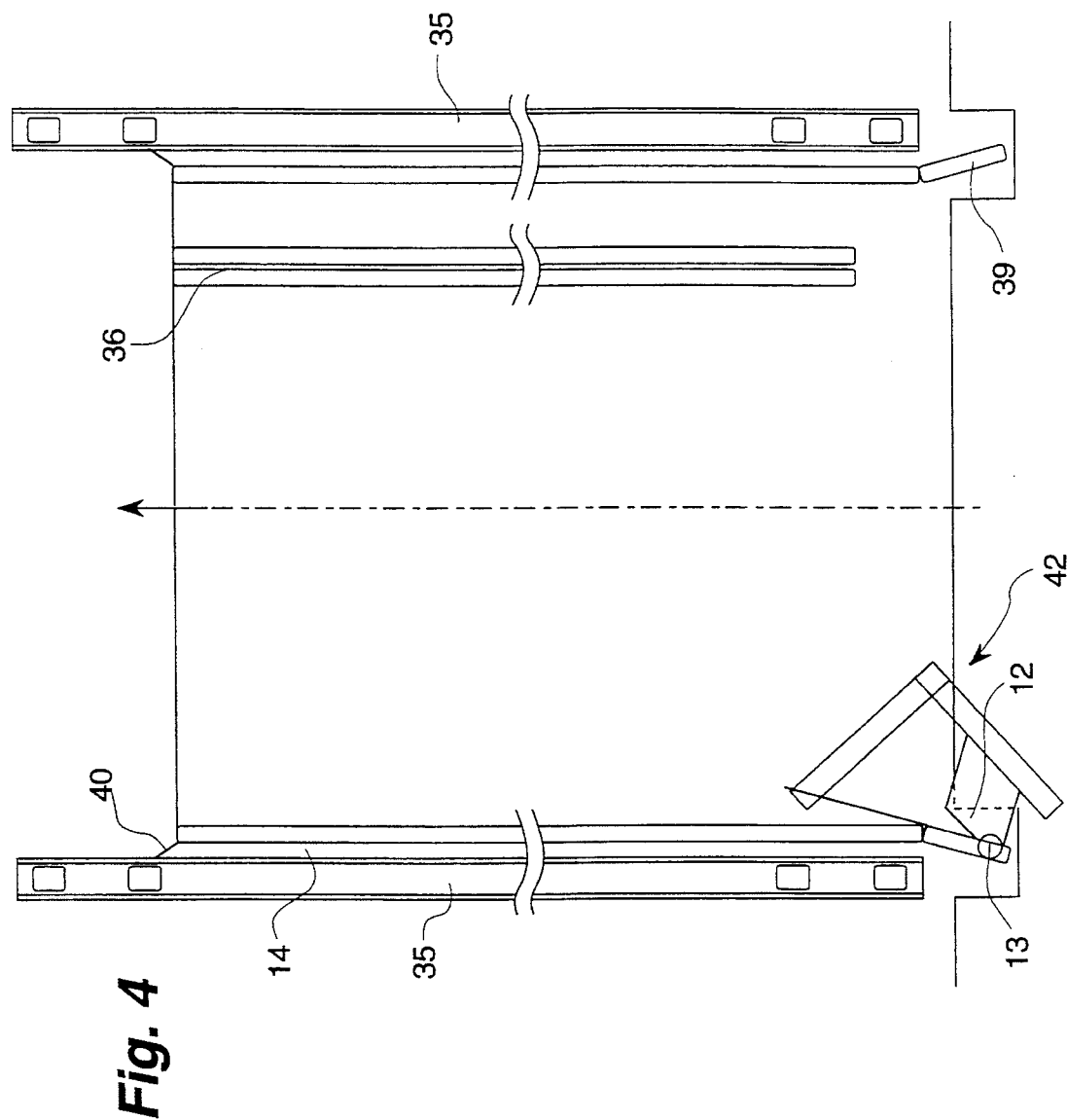

ANTICOLLISION DEVICE FOR DRIVERLESS INDUSTRIAL TRUCKS

FIELD OF THE INVENTION

The present invention pertains to an anticollision device for driverless industrial trucks, preferably automotive assembly platforms (skids), with switching bails, which are arranged on the front side and/or end side of the industrial truck and are articulated, displaceably at least in the longitudinal direction of the industrial truck, to the industrial truck by means of bilateral toggle levers, and the switching bails maximally project from the vehicle contour in an outer operating position during single travel of the industrial trucks at spaced locations from one another, and they decelerate the industrial truck and/or switch off its traveling mechanism on impact against an obstacle via switching means, and the switching bails can be pressed into an out-of-operation position directed against the industrial truck to form a space-free pushing unit consisting of at least two industrial trucks.

BACKGROUND OF THE INVENTION

A plurality of anticollision and anti-obstacle devices for industrial trucks have been known from the state of the art, which decelerate the vehicle to a complete stop via mechanical, hydraulic, electrical, or electronic control means on impacting any type of obstacle, i.e., an object or a person, either by initiating a braking process, i.e., application of the brakes and/or by switching off the traveling mechanism. Such anti-obstacle devices are usually mounted in front of the front sides of the vehicles, especially in the direction of travel, as a consequence of which they are unable to move in a pushing unit, partly because they would mutually switch off one another due to contact of their protective devices, and partly because the necessary pushing forces cannot be transmitted.

DE-A 40 20 286 discloses an assembly line formed by automotive skids, in which the skids are moved up against each other without gaps after their own drives are automatically put out of operation, and continue to move as a pushing unit moved by a common, external drive module at adjustable speed in a restrictedly guided manner, for which the front and rear safety switching bails of each skid are pressed in, partially to a stop, via toggle levers when the skids run into each other. Since the pushing forces for moving on the entire pushing unit are transmitted directly via the toggle levers in this arrangement, these levers must be made as correspondingly robust levers in order to be able to absorb the pushing forces. The increase in weight caused by this also leads to an increase in the moment of inertia, and it may exert a delaying effect in the case of an emergency shutoff of the skid as a consequence of collision with an obstacle, because the sensitivity of the safety switching bail is reduced. Since these are usually equipped with elastic, readily compressible and deformable person protection devices in the form of so-called "bumpers," the transmission of pushing forces via the safety switching bails is defeated. Depending on the design and the surface cover of the safety switching bails, there also is a risk that they do not form a closed, walkable surface, thus increasing the risk of accident for the assembly workers, when they are pressed in only partially within the pushing unit.

SUMMARY AND OBJECTS OF THE INVENTION

The principle object of the present invention is therefore to provide—at a minimum of effort and manufacturing costs—an anticollision device for driverless industrial trucks, which is not prone to malfunction, is especially reliable in operation, avoids the above-mentioned disadvantages, and is suitable for both single travel of the industrial trucks at spaced locations from one another and gap-free travel in a common pushing unit, wherein the changeover of the anticollision device to the actual mode of operation is to be performed automatically, without the need for human intervention.

The above task is accomplished according to the present invention by the displacement of the switching bails from their operating position into their out-of-operation position and vice versa being able to be initiated stationarily and controlled automatically, wherein the switching means can be automatically inactivated and reactivated synchronously with the displacement, and wherein the out-of-operation position of the switching bails is located completely within the vehicle contour, such that the pushing forces can be directly transmitted from the industrial truck actually traveling in the rearmost position to the vehicle chassis of the industrial truck actually traveling in front of it.

This arrangement guarantees that the anticollision device can be designed with the necessary sensitivity and it switches off the industrial truck during individual operation with absolute certainty in the case of collision with an obstacle, and the anticollision device changes over to pushing unit operation at a high degree of certainty, so that even strong pushing forces can be transmitted without play, without running the risk of damaging or even destroying devices of the vehicle. The need for cost-intensive manual change overs of the vehicle is eliminated, so that the assembly worker is able to concentrate on his own assembly work. Since the control for automatically triggering the displacement of the switching bails was placed directly into the assembly line once and for all, the effort in terms of control engineering for the individual industrial trucks can be kept at the lowest level possible, which considerably reduces especially the system costs of extensive assembly plants with up to a hundred vehicles.

In a variant of the idea of the present invention, the switching bails are pretensioned in relation to the vehicle chassis in a spring-loaded manner, and are displaceable into their out-of-operation position against the pretensioning force (spring force) in a mechanically restrictedly guided manner. Incorrect human interventions are ruled out and a high level of reliability of operation is guaranteed by this forced mechanical control.

To achieve independence from stationary devices—if this is not permitted by, e.g., the station-side space conditions or special needs of use—the switching bails are pretensioned in relation to the industrial truck in a spring-loaded manner and can be displaced by a motor against the pretensioning force (spring force) at least from their operating position into their out-of-operation position, and the pulling means and/or pressing means fixed on the vehicle, which are preferably of mechanical design, are provided for the motor-operated displacement of the switching bails, so that the person skilled in the art is able to use inexpensive, commercially available components.

It proved to be advantageous for the motor-operated displacement of the switching bails to be able to be triggered by stationary, preferably contactless, signal transmission and/or depending on odometry.

To keep the expense in terms of control engineering at the lowest possible level, the switching bails can again be displaced automatically into their operating position by spring force in an advantageous embodiment of the present invention, which eliminates the need for manual interventions and is therefore beneficial for the reliability of operation.

One special variant of the present invention is characterized in that each toggle lever is part of a multi-articulated lever mechanism, which is arranged between the switching bail and the vehicle chassis and is designed as a four-bar mechanism, wherein easy and reliable displacement of the switching bail is guaranteed by the special lever geometry.

In a variant of the idea of the present invention, the opening angle of the toggle lever is variable, depending on the use and/or speed, such that an adjustable stop, which is located opposite the free end of the second toggle lever arm and is in functional connection with same, is attached to the first toggle lever arm, as a result of which the coasting of the switching bail and its displacement path can be adjusted.

According to a preferred embodiment of the present invention, a roller lever is attached to the first toggle lever arm, wherein the said roller lever faces the outside of the vehicle and its end-side control roller is in functional connection with a stationary guide rail, which tapers toward the pushing unit section in the direction of travel in the entry area and expands in the exit area of the pushing unit section, so that the first toggle lever arm can be pressed in on entry of an industrial truck into the pushing unit section, while the opening angle of the toggle lever decreases, and the spring lever is displaceable against the spring force of at least one spring means. This simple type of forced mechanical control is absolutely reliable in its mode of operation, not susceptible to malfunction, and, in principle, maintenance-free, as well as extremely inexpensive due to the lack of electronic or hydraulic control means, which is appreciable especially in the case of large assembly systems comprising a plurality of industrial trucks.

One advantageous characteristic of the present invention is that the transverse guide is designed as a motor-drivable threaded spindle, on which the guide sleeves are displaceable in one direction by means of spindle nuts, as a result of which corresponding stationary control devices become unnecessary.

According to a design characteristic of the present invention, two separate spring means supported on a central, stationary fixed stop are provided on the cross guide. This offers the advantage that each of the bilateral lever mechanisms is pretensioned in a spring-loaded manner separately and independently from each other, as a result of which the switching bail not only can be displaced in parallel, but it can also be pushed in obliquely in the case of a unilateral impact against an obstacle on the roadway, and it can emergency stop the industrial truck.

It is recommended for certain conveying means to attach—depending on the type and design of the vehicle—pulling means, which can be actuated by a motor against the pretensioning force (spring force), to the guide sleeves, which also serves the independence from stationary guiding and control devices, e.g., when floor installation of these devices is made impossible by limited space conditions.

To guarantee optimal reliability of operation and to minimize the risk of accident for humans and vehicles, readily compressible person protection elements, in which signal-generating control strips are embedded redundantly in relation to the switching element, are arranged at the front switching bail.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a top view of a pushing unit section with stationary drive and guide means.

DETAILED DESCRIPTION OF THE PREFERRED EMBODIMENT

Figure 1:
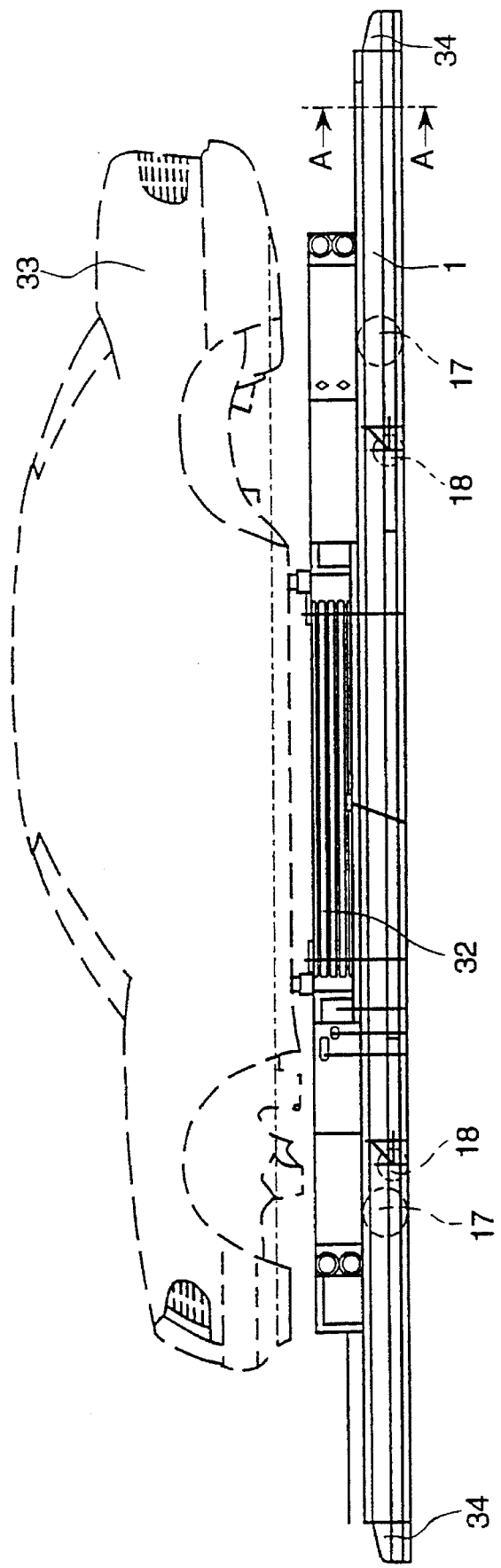
FIG. 1 is a side view of a driverless industrial truck designed as an automotive assembly platform.

According to FIG. 1, a driverless industrial truck 1 is designed as an automotive assembly platform (skid). The industrial truck 1 is provided, in the front and rear areas, with a centrally arranged as well as steerable and controllable drive wheel 17 each, by means of which the industrial truck 1 is able to move independently. Lateral support rollers 18, preferably pairs of support rollers, are provided on both sides of the drive wheel or drive wheels 17. A lifting device 32, by means of which a body to be assembled 33—a passenger car body in the exemplary embodiment—can be adjusted in height, is located on the industrial truck 1. In addition, the industrial truck is also equipped on its front and end sides with anticollision devices 34, which are indicated only schematically in FIG. 1 and will be described in detail below.

Figure 2:
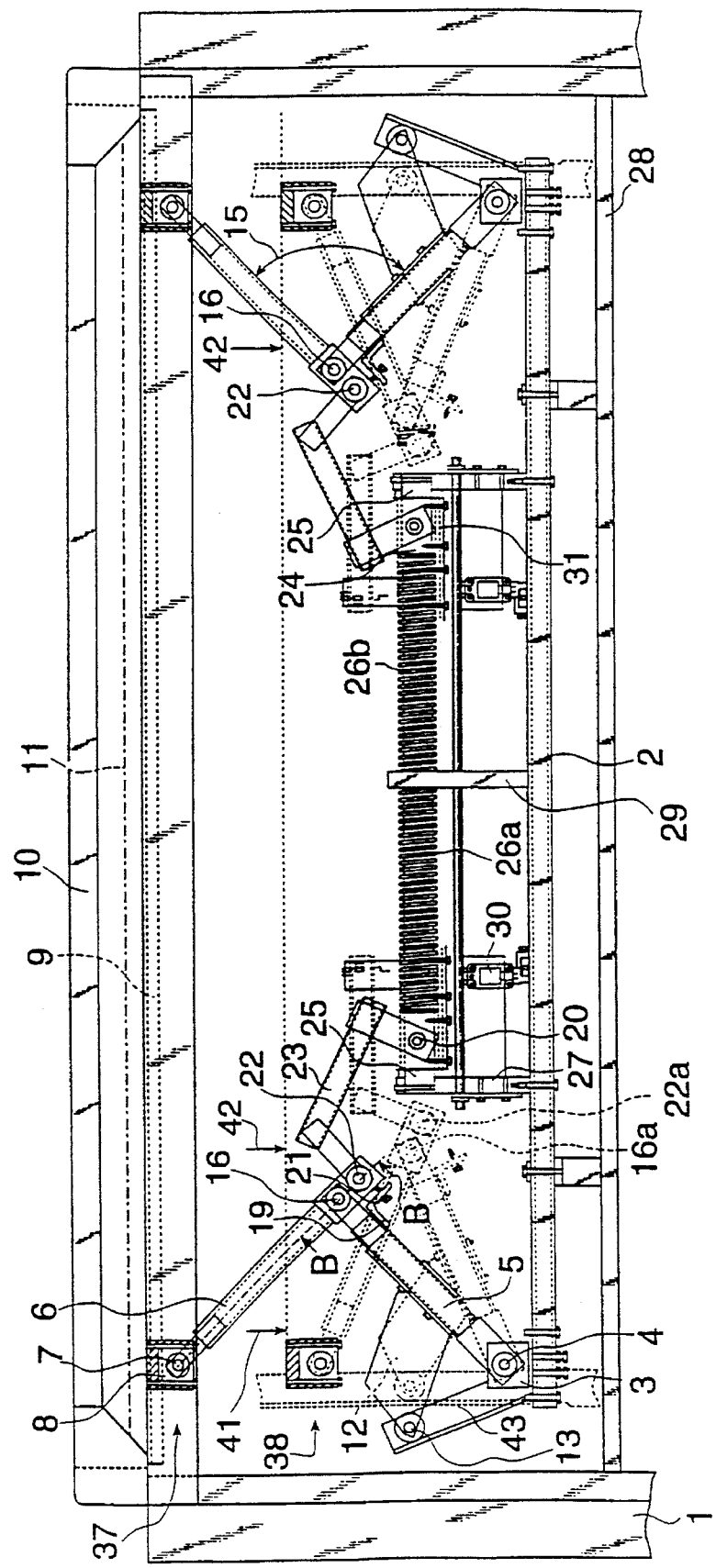
FIG. 2 is a top view of an anticollision device according to the present invention, with representation of a switching bail in the operating position and in the out-of-operation position.

FIG. 2 shows a top view of one of these the anticollision devices 34 in a state in which the surface cover has been removed. A crossbar 2, which extends approximately over the entire width of the vehicle, is arranged on a vehicle chassis 28 of prior-art design, which is not represented and described more specifically. Holders 3 are attached, preferably welded or screwed, to the crossbar 2 at both of its ends. A first lever arm 5 of a toggle lever means 5, 6, which is part of a multi-articulated lever mechanism 42, is rotatably arranged at a fixed hinge point 4 in each the holder 3. This lever mechanism 42 is preferably designed as a four-bar mechanism, but it also may have a greater or lower number of hinges, depending on the vehicle geometry and the conditions of use. A second lever arm 6 of the toggle lever means 5, 6 is mounted in a mobile hinge point 7 of a holder 8, to which a front-side switching bail 9 is attached. The switching bail 9 is equipped with an electric person protection element 10 made of a readily compressible material, a so-called "bumper," in which control strips 11, indicated schematically, are embedded in the known manner.

A roller lever 12, which faces the outside of the vehicle, and at which a control roller 13, which is in functional connection with a guide rail 43 for changing the opening angle 15 of the toggle lever means 5, 6 (see for example FIG. 3), is arranged on its end side, is attached to the first lever arm 5. To limit the opening angle 15, a stop 19 is attached to the first lever arm 5 opposite a free end of the second lever arm 6, which projects over a toggle link 16 of the toggle lever means 5, 6. This stop 19 may be designed as a fixed stop or as an adjustable stop. In the exemplary embodiment according to FIG. 3, the stop 19 is of an angular design, one angle arm opposing the second lever arm 6 in parallel. A set screw 21, which is supported at the second lever arm 6, is arranged in this lever arm.

A spring lever 23 is rotatably arranged in a hinge point 22 in the extension of the second lever arm 6, wherein the extension projects beyond the toggle link 16. In this exemplary embodiment, this spring lever 23 is comprised of three lever parts, which are connected to one another in a bending-resistant manner and are not shown in detail, in an approximately U-shaped arrangement. The other end of the spring lever 23 is articulated in a hinge point 20 to a guide sleeve 24, which is linearly displaceable in a cross guide 25 against the first of at least one spring means 26 in the form of a thrust crank. The cross guide 25 may have various cross-sectional shapes, but is preferably designed as a flexible spindle. At right angles to the longitudinal axis of the industrial truck 1, it is arranged in two spindle holders 27, which are attached, preferably welded or screwed, to the crossbar 2.

The spring means 26 may be of mechanical, hydraulic or pneumatic design, and is preferably designed as a compression spring in the exemplary embodiment. As is shown in FIG. 2, it is possible to use two the separate spring means 26a and 26b each instead of a the single spring means 26 between the guide sleeves 24 of the bilateral spring levers 23. A fixed stop 29, which is attached to the crossbar 2 and by which the two spring means 26a and 26b are supported during compression by the guide sleeves 24, is arranged in the center of the cross guide 25 in this case.

Figure 3:
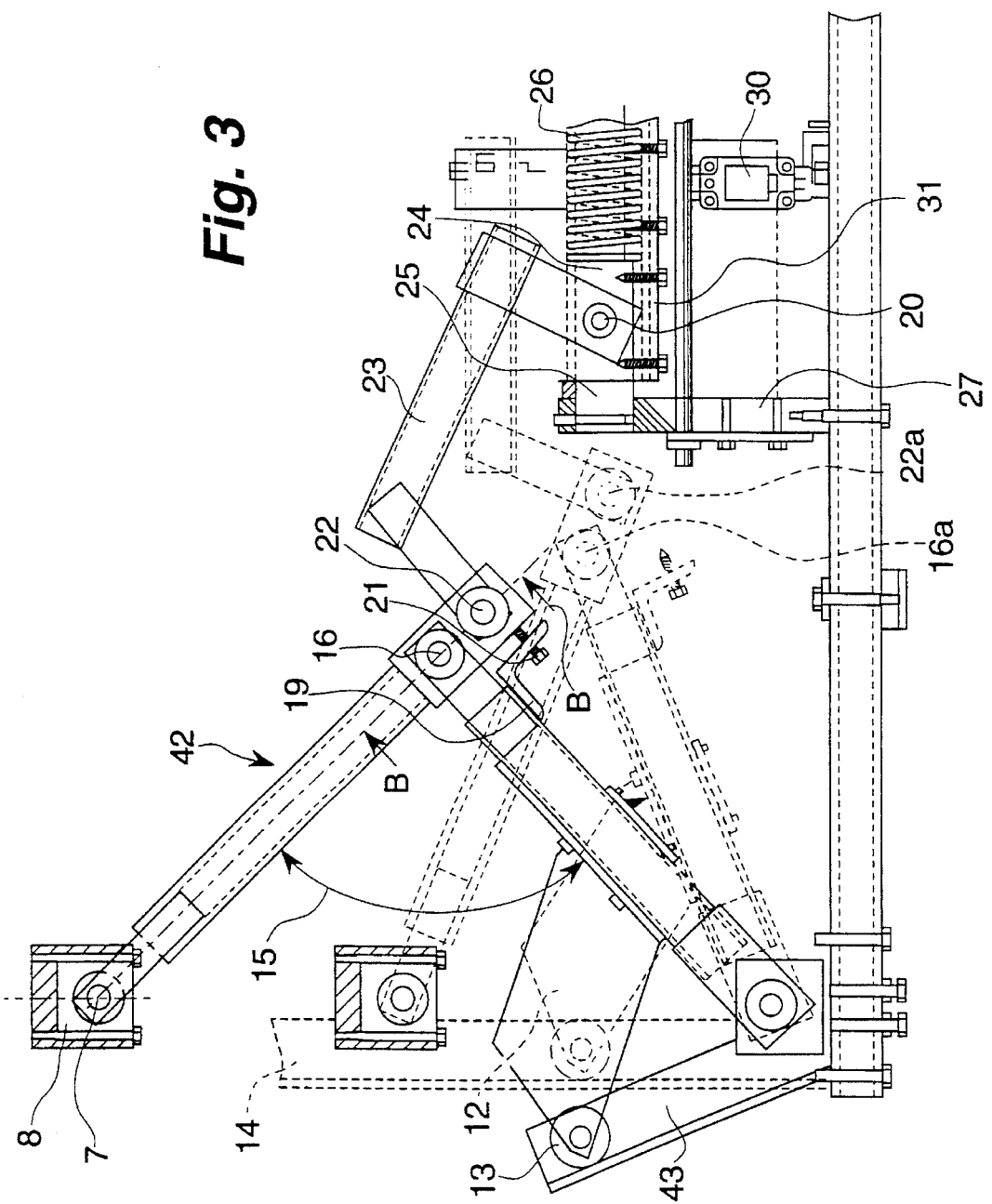
FIG. 3 is a unilateral detail view from FIG. 2, with representation of the lever geometry of a lever mechanism and the corresponding mechanical forced control.

A switching means 30, which operates electromechanically, optically, or optoelectronically, is attached to the crossbar 2 in the range of displacement of each guide sleeve 24 opposite the cross guide 25. For simplicity's sake, the switching means 30 in the exemplary embodiment according to FIGS. 2 and 3 is designed as a limit switch. This is in functional connection with a switching plate 31, which is attached to the guide sleeve 24 and contacts the limit switch (the switching means 30) during the displacement of the guide sleeve 24 in the direction of the longitudinal axis of the vehicle. The switching means 30 and the switching plate 31 are adjustable in relation to one another and lockable to change the switching path or the switching time.

Depending on station-, operation- or vehicle-related parameters, it may be advantageous in specific cases of application to displace the switching bails 9 by a motor in an equivalent manner, rather than in a mechanically restrictedly guided manner, at least from their operating position 37 into their out-of-operation position 38. According to an embodiment that is not represented specifically, both pulling and pressing means of many different designs, preferably mechanical design, which are or can be coupled with motor drive means, may be used for this purpose.

The pressing means are preferably designed as a spindle drive of prior-art design, and the cross guide 25 is replaced in this case with a threaded spindle, which has threads in the opposite direction over half of it. It is also possible, instead, to use two separate, centrally mounted threaded spindles with right-hand and left-hand threads, respectively. Spindle nuts, which move in the inward direction on the threaded spindle during the motor-induced rotation of the threaded spindle and displace the guide sleeves 24 in relation to one another against the pretensioning force of the spring means, are arranged at the end side of the threaded spindle.

For example, toothed belts, chains, or other machine parts of equivalent function, which are attached to the guide sleeves 24 at the hinge points 20 and can be moved by a motor to displace the switching bail 9 from its operating position 37 into its out-of-operation position 38 against the pretensioning force (spring force), may be used as pulling means. The pulling means may be of a one-part, endless design or of a two-part, linear design, a separate linear pulling means being associated with each the lever mechanism 42 in the latter case.

The control command for activating the aforementioned pressing or pulling means is triggered stationarily at predetermined fixed points of a pushing unit section or assembly line, e.g., by means of control cams or other mechanical signal transmitters of equivalent function in the case of, e.g., simple and inexpensive conveying system variants. As an alternative hereto, complex conveying systems may justify a maximization of the expense of automation. It is recommended in this case to control the stationary pulling or pressing means of the vehicle at corresponding points of the travel path in a contactless manner, in which case the signal and/or data transmission takes place by means of optical, optoelectronic, capacitive, inductive, or similar signal transmitters. If necessary, the industrial trucks 1 may also be equipped with internal odometers of the vehicle, which generate distance dependent control signals either alone or in combination with one or more of the aforementioned signal transmitters, preferably in a program controlled manner.

Hydraulic or pneumatic components, e.g., hydraulic lifting pistons or pneumatic compression springs, may also be used instead of the mechanical pulling means and/or pressing means in the above-described embodiment. Since all the aforementioned means are of commercially available design, their function and design are assumed to be known, and consequently they will not be described and represented in greater detail.

FIG. 4 shows a schematic representation of the station-side devices of a pushing unit section. As an example, bilateral roller conveyors 35, on which the industrial trucks are forwarded in a forced-driven manner, are provided as a stationary driving device for a pushing unit consisting of a plurality of the industrial trucks 1. It is self-explanatory that functionally equivalent drive means, e.g., chain conveyors, friction rollers or belt drives, and the like, may be used. At least one floor-mounted guide element 36, e.g., a running rail, may be provided between the bilateral roller conveyors 35 in the direction of travel of the vehicle for the longitudinal guidance of the pushing unit. The guide rails 14 are arranged within the roller conveyors 35, in parallel to the longitudinal direction thereof. These guide rails 14 are provided with entry bevels tapering toward the inside in a funnel-shaped manner in the start area when viewed in the direction of travel of the industrial truck 1, and with exit bevels expanding in the outward direction in a funnel-shaped manner in the finish area.

The mode of operation of the anticollision device 34 according to the present invention will be explained in greater detail below.

FIGS. 2 and 3 show the anticollision device 34 in the extended state in its operating position 37 and in the withdrawn position, indicated by dash-dotted lines, in its out-of-operation position 38. The industrial truck 1 is controlled automatically, e.g., inductively, in the case of individual operation during single travel. The anticollision device 34 is activated during this automatic mode of operation, and is in the operating position 37, in which the coasting of the switching bail 9 is greater than the path of deceleration of the industrial truck 1 until complete stop. By changing the opening angle 15 of the toggle lever means 5, 6, the coasting can be adjusted depending on the use and/or the speed by means of the set screw 21 located in the stop 19.

As soon as the industrial truck 1 strikes an obstacle of any kind located in the roadway area, the person protection element 10 arranged on the front side is pressed in and is elastically deformed in the process, and a signal for emergency shutoff of the industrial truck 1 is generated via the control strip 11 and/or the switching element 30 embedded therein in a known manner. As a result, a motor brake is usually actuated, or the traveling mechanism is switched off, as a result of which the industrial truck 1 is decelerated to a stop over the shortest distance possible. If the industrial truck 1 is equipped with wheel brakes, these may additionally be actuated.

It is necessary in many cases of application to pile up or string together the individual industrial trucks 1 and to allow them to proceed as a closed pushing unit by means of an external drive in a restrictedly guided manner, as a result of which the energy capacity of the self-contained drive can be saved, among other things, and the operating time of the vehicle can be considerably increased. The roller conveyors 35 shown in FIG. 4 are used for this purpose.

Since the industrial trucks 1 are also often used as assembly platforms for the manufacture and assembly of workpieces, objects or devices, on which the assembly workers travel directly with the industrial truck during their work, the string of industrial trucks 1 must form a closed, walkable surface in the pushing unit in order to rule out any risk of injury and accident hazards for persons, i.e., there must no longer be any gaps between the individual industrial trucks 1. Since the ends of the industrial trucks 1 touch each other, and the industrial truck 1 actually traveling in the rearmost position pushes those in front of it, it is necessary to put the anticollision devices 34 out of operation during the formation of a pushing unit, partly in order to make it possible to transmit the necessary pushing forces, and partly in order to prevent the emergency shutoff of the industrial trucks 1. This is achieved in the manner described below.

When a the industrial truck 1 enters the pushing unit section shown in FIG. 4, e.g., an assembly line, the control rollers 13 of the roller levers 12 of the bilateral lever mechanisms 42 form an automatic displacement means and run against the entry bevels 39 of the guide rails 14 in a restrictedly guided manner. Due to their tapering in the inward direction, the roller levers 12 are pressed in the direction of the longitudinal axis of the vehicle during the further movement of the industrial truck 1, as a result of which the lever mechanisms 42 are moved. The toggle levers 5, 6 are now automatically displaced, while their the opening angle 15 decreases at the same time, into a position indicated by dash-dotted lines in FIG. 3, and the toggle links 16 and the hinge points 22 move into inner positions 16a and 22a on circular arc-shaped paths.

The deflecting movement of the hinge points 22 to 22a is converted by the spring levers 23 into quasi linear thrust crank movements on the cross guide 25 due to the restricted guiding of the guide sleeves 24 articulated to the spring levers, and the guide sleeves 24 are linearly displaced against the pretensioning force of the one or more spring means 26, 26a, 26b. The switching means 30 are now contacted by the switching plate 31, and the self-contained drive of the industrial truck 1 is switched off. Due to the above-described movement of the lever mechanisms 42, the switching bail 9 is pressed in from its outer operating position 37 in the direction of the reference arrow 41, and it is now in its out-of-operation position 38, which is located within the end-side contour of the vehicle.

The industrial truck 1 now continues to travel, driven by external drive means, on the roller conveyors 35 to the end of the pushing unit section, and the pushing forces can be directly transmitted from the industrial truck 1 actually traveling in the rearmost position to the vehicle chassis 28 of the industrial truck 1 located in front of it without loss due to the pushed-in out-of-operation position 38 of the switching bails 9.

When the pushing unit is broken up, the mechanical force guidance of the roller levers 12 is again eliminated within the guide rails 14 by the roller levers 12 being again released by the outward expanding exit bevels 40 of the guide rails 14. The guide sleeves 24 are automatically displaced on the cross guide 25 in the outwardly direction against the spindle holders 27 by the pretensioning force of the one or more compressed spring means 26, 26a, 26b, and the lever mechanisms 42 are again moved in the opposite direction until the extended free end of the second lever arm 6 strikes the set screw 21 of the stop 19 attached to the first lever arm 5. The opening angle 15 of the toggle levers 5, 6 is now again increased to its original value, and the switching bail 9 is extended into its operating position 37 located outside the vehicle contour.

Redundant emergency shutoff of the industrial truck 1, which will be explained in greater detail below, is provided for safety reasons for the case of collision of the vehicle with an obstacle located in the roadway.

Since the person protection element 10 has only a limited deformability, depending on the modulus of elasticity of the material of which it is made, and is consequently able to absorb only part of the kinetic impact energy on striking an obstacle, the switching bail 9 is pushed in the inward direction against the industrial truck 1, depending on the travel speed of the industrial truck 1. The movement process of the lever mechanism or mechanisms 42 which now takes place corresponds, in principle, to that described above, the difference being that the displacing force is introduced into the lever mechanisms 42 frontally, in the direction of the longitudinal axis of the vehicle, via the switching bail 9 and the mobile hinge points 7, rather than laterally via the roller lever 12. The emergency shutoff of the traveling mechanism is now triggered via the switching means 30.

Depending on whether the obstacle is located in the middle or on one side of the roadway, the two mobile hinge points 7 and consequently the switching bail 9 are displaced either in parallel or in an offset manner. There is a possibility in the latter case that only one of the two hinge points 7 will be displaced, while the other remains in its original position (absolute oblique position of the switching bail 9), or both the hinge points 7 will be displaced offset in relation to one another, which leads to different opening angles 15 of the bilateral toggle levers 5, 6 (slightly oblique position of the switching bail 9).

The preset invention is, of course, by no means limited to the exemplary embodiment represented in the figures and described. It is self-explanatory that numerus design modifications, e.g., the use of pneumatic or hydraulic springs, as well as the use of equivalent electronic, optical, or optoelectronic switching means, such as photocells, photodiodes, etc., are within the scope of the present invention. It is also possible to use coupler or lever mechanisms of a different type, e.g., ones with more or fewer than four hinges, depending on the vehicle geometry and the necessary switching path.

While a specific embodiment of the invention has been shown and described in detail to illustrate the application of the principles of the invention, it will be understood that the invention may be embodied otherwise without departing from such principles.

What is claimed is:

1. An anticollision device for a truck, the device comprising:

a bail positioned on one side of the truck;

toggle lever means for movably connecting said bail to said truck between an operating position where said bail is at a maximum distance from the truck and an out-of-operation position where said bail is positioned within a contour of the truck, said out-of-operation position causing pushing forces to be directly transmitted from one truck travelling in rearmost position to another industrial truck travelling in front thereof, said toggle lever means including a plurality of toggle levers, each toggle lever forming part of a multiarticulated lever mechanism designed as a four-bar mechanism and arranged between said bail and said truck, said plurality of toggle levers including a first lever arm articulated to a hinge point that is rigidly integrated in the truck, said plurality of toggle levers also including a second lever arm articulated at a hinge point that is rigidly integrated into said bail, said toggle lever means also including a spring lever with a first end displaceable in a linearly guided manner against spring force, said spring lever having a second end articulated at an end side of said second lever arm behind a corresponding one of said toggle levers;

displacement means for displacing said bail from said operating position to said out-of-operation position in cooperation with a stationary guide;

switch means for deactivating the truck when said bail is in said out-of-operation position and for reactivating the truck when said bail is in said operating position.

2. An anticollision device according to claim 1, wherein:

said bail is pretensioned in relation to said industrial truck in a spring-loaded manner and movement of said bail into said out-of-operation position is against a pretensioning spring force in a mechanically restrictedly guided manner.

3. An anticollision device according to claim 1, wherein:

said toggle lever means is provided with means for automatically displacing said bail into said operating position by spring force.

4. An anticollision device according to claim 1, wherein:

an opening angle of said each toggle lever is adjustable, and an adjustable stop located opposite a free end of one of said toggle levers in functional connection therewith, is attached to a first one of said toggle levers.

5. An anticollision device according to claim 1, wherein:

a roller lever is provided facing an outside of the truck, said roller lever having an end side control roller in functional connection with the stationary guide tapering in an entry area into a pushing unit section in a direction of travel of the industrial truck and expanding in an exit area, said roller lever being attached to a first lever arm of said toggle levers for pressing said first lever arm as an opening angle of said toggle levers decreases, on entry of the truck into a pushing unit section, wherein a spring lever is displaceable against a spring force of at least one spring means.

6. An anticollision device according to claim 5, wherein:

said spring means is arranged on a stationary cross guide of the truck between guide sleeves of the spring levers of the toggle means.

7. An anticollision device according to claim 6, wherein:

said cross guide is designed as a drivable threaded spindle, on which guide sleeves are displaceable by means of spindle nuts in at least one direction.

8. An anticollision device according to claim 7, wherein:

two separate spring means, supported by a central stationary fixed stop, are provided on said cross guide.

9. An anticollision device according to claim 7, wherein:

pulling means for pulling via motor actuation against a pretensioning spring force, are attached to said guide sleeves.

10. An anticollision device according to claim 9, wherein:

said spring means are of a mechanical design.

11. An anticollision device according to claim 7, wherein:

a switching member attached to the truck, formed as a limit switch, is provided in a range of displacement of said guide sleeve, opposite said cross guide.

12. An anticollision device according to claim 1, wherein:

said bail includes readily compressible person protection elements arranged at a front thereof and including at least one signal generating control strip embedded in said bail and redundantly deactivating the truck with said switching means.

13. An anticollision device according to claim 1, wherein:

travel of said bail between said operating and out-of-operation position is greater than a deceleration path of the truck.

* * * * *